United States Patent
Murai et al.

[11] Patent Number: 5,940,280
[45] Date of Patent: Aug. 17, 1999

[54] CONVERTER CIRCUIT OF BATTERY CHARGER FOR ELECTRIC VEHICLE

[75] Inventors: Yasumasa Murai; Hiroki Nishimura; Katsunori Sugimori, all of Tokyo, Japan

[73] Assignee: Nippon Electric Industry Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/056,726

[22] Filed: Apr. 8, 1998

[30] Foreign Application Priority Data

Feb. 23, 1998 [JP] Japan .................................. 10-057418

[51] Int. Cl.⁶ .................................................. H02M 3/335
[52] U.S. Cl. .............................. 363/17; 363/98; 363/132
[58] Field of Search ................................. 363/17, 98, 132

[56] References Cited

U.S. PATENT DOCUMENTS 4,025,850 5/1977 Spiteri ...................................... 323/312
5,592,367 1/1997 Sugimori et al. .......................... 363/17

OTHER PUBLICATIONS

"Contactless Charging and Communication for Electric Vehicles", IEEE Industry Applications Magazine, Nov./Dec. 1995, pp. 4–11.

*Primary Examiner*—Shawn Riley
*Attorney, Agent, or Firm*—Jordan and Hamburg LLP

[57] ABSTRACT

A battery charger converter circuit is disclosed in which a half-bridge rectifier circuit formed from two diodes, a half-bridge circuit formed from two switching elements, and a series circuit formed from two capacitors are connected at either end, respectively, thereof in parallel to each other, a boosting reactor being provided at the AC side of the half-bridge rectifier circuit; a primary circuit of the converter, including a primary coil of a high-frequency transformer, connected between a common point of connection between the switching elements and a common point of connection between the two capacitors, and a control circuit for the two switching elements; and a secondary circuit of the converter, including the secondary coil of the high-frequency transformer, a full-bridge rectifier circuit connected in parallel to the secondary coil and a smoothing capacitor; a high-frequency power generated by the primary circuit of the converter being rectified by the secondary circuit and charged into cells.

20 Claims, 4 Drawing Sheets

CONVERTER CIRCUIT OF BATTERY CHARGER FOR ELECTRIC VEHICLE

BACKGROUND OF THE INVENTION

The present invention relates to a battery charger for collectively charging a plurality of secondary cells, and more particularly, a converter circuit for a battery charger used to charge secondary cells for an electric vehicle.

For effectively and rapidly charging secondary cells used as a power supply in an electric vehicle, a non-contact type battery charger has been proposed which makes use of an electromagnetic induction by a high-frequency transformer.

Figure 3:
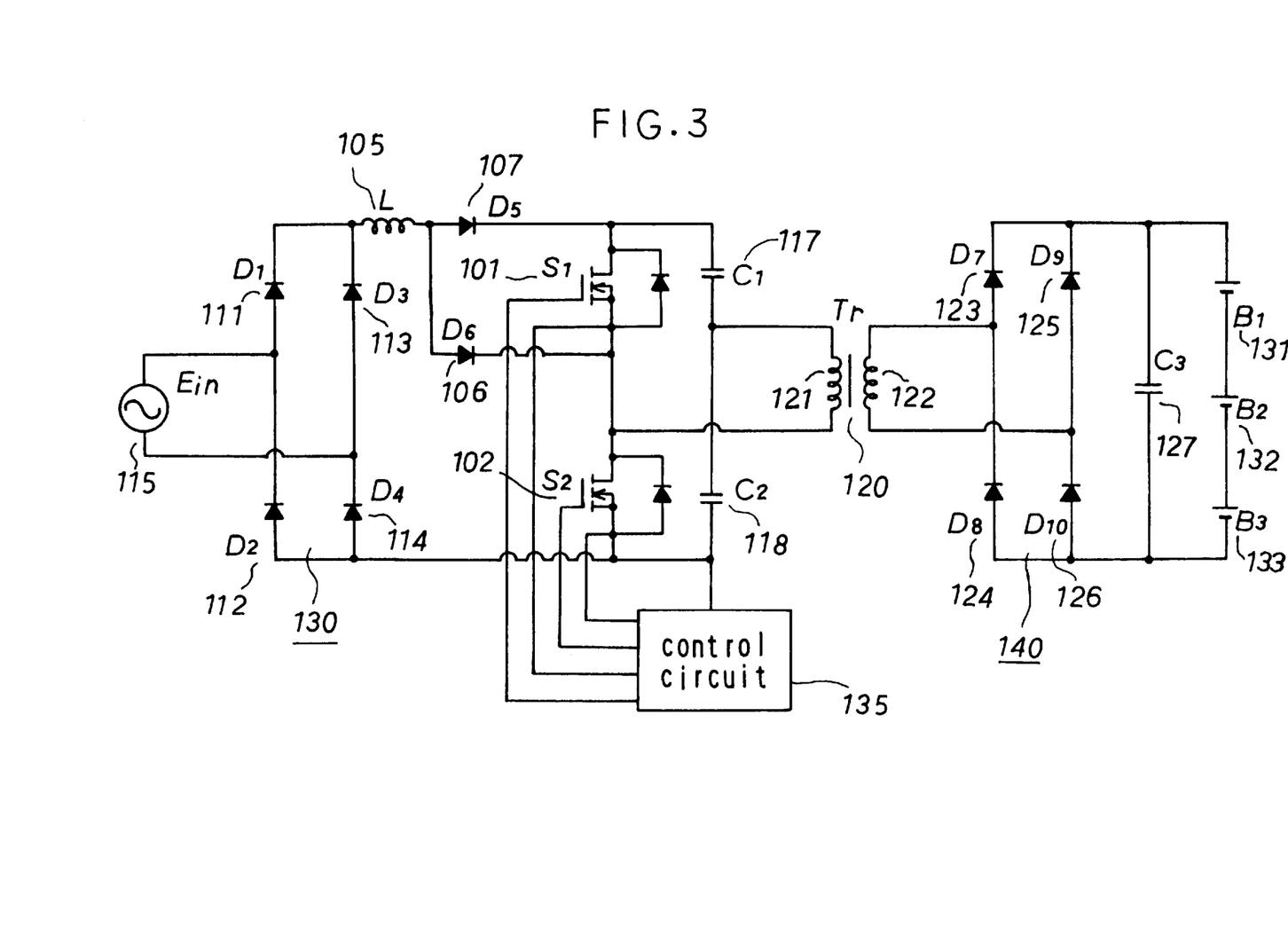
FIG. 3 is a block diagram of a conventional battery charger converter circuit (half-bridged)

FIG. 3 is a block diagram of a conventional converter circuit designed for use in a one-converter type battery charger comprising a half-bridged DC/DC converter and a boosting PFC.

As shown in FIG. 3, AC power from an AC source 115 is supplied to a full-bridge rectifier circuit 130 formed from four diodes 111 to 114 for conversion into a DC current. A boosting reactor 105 is connected at one end thereof to a positive terminal of the full-bridge rectifier circuit 130, and at the other end thereof to anodes of two diodes 106 and 107. A switching element 101 is connected at a drain thereof to the cathode of the diode 107, and at source thereof in series to drain of a switching element 102 having a source thereof connected to a negative terminal of the full-bridge rectifier circuit 130. Thus, the switching elements 101 and 102 form together a half-bridge circuit.

Also, the diode 106 is connected at the cathode thereof to a common point of connection between the switching elements 101 and 102.

Further, a series circuit formed from two capacitors 117 and 118 is connected in parallel between the drain of the switching element 101 and the source of the switching element 102. A primary coil 121 of a high-frequency transformer 120 is provided having the primary coil 121 thereof connected between a common point of connection between the capacitors 117 and 118 and the common point of connection between the switching elements 101 and 102.

A full-bridge rectifier circuit 140, formed from four diodes 123 to 126, is connected in parallel to either end of a secondary coil 122 of the high-frequency transformer 120. Also, either end of the full-bridge rectifier circuit 140 is connected to a series circuit formed from three cells 131 to 133 and parallel capacitor 127. Thus, high-frequency power generated at the primary side of the high-frequency transformer 120 is full-wave rectified by the full-bridge rectifier circuit 140, and charged into the cells 131 to 133.

A control circuit 135, formed from a variable-frequency oscillator circuit or VF converter, is connected to the gate and source of each of the switching elements 101 and 102 through a drive circuit to provide a control signal under which the switching elements 101 and 102 are controlled to turn on and off alternately.

More particularly, when the switching element 101 is turned off while the switching element 102 is turned on, an output voltage from the full-bridge rectifier circuit 130 is short-circuited through the diode 106 so that energy is stored into the boosting reactor 105.

Then, when the switching element 101 is turned on while the switching element 102 is turned off, the energy stored in the boosting reactor 105 is charged into the capacitors 117 and 118 through the diode 107.

As the switching elements 101 and 102 are turned on and off alternately under the control signal supplied from the control circuit 135, the high-frequency transformer 120 is supplied at the primary coil 121 thereof with a positive- or negative-going high-frequency current through the capacitor 117 or 118.

The gradient of a current flowing through the boosting reactor 105 when the switching element 102 is turned on is proportional to the output voltage from the full-bridge rectifier circuit 130, so the current flows through the boosting reactor 105 in the discontinuous conduction mode (DCM). If the switching element 102 is kept turned on for a fixed period, the envelope and mean value of an input current is proportional to the output voltage from the full-bridge rectifier circuit 130.

Therefore, the power factor can be made 1.0 with no duty ratio control. However, if the frequency is a fixed one, a voltage across the capacitors 117 and 118 will vary very much depending upon a load current. To control the load voltage, the frequency is controlled by the control circuit formed from the variable-frequency oscillator circuit or VF converter.

Figure 4:
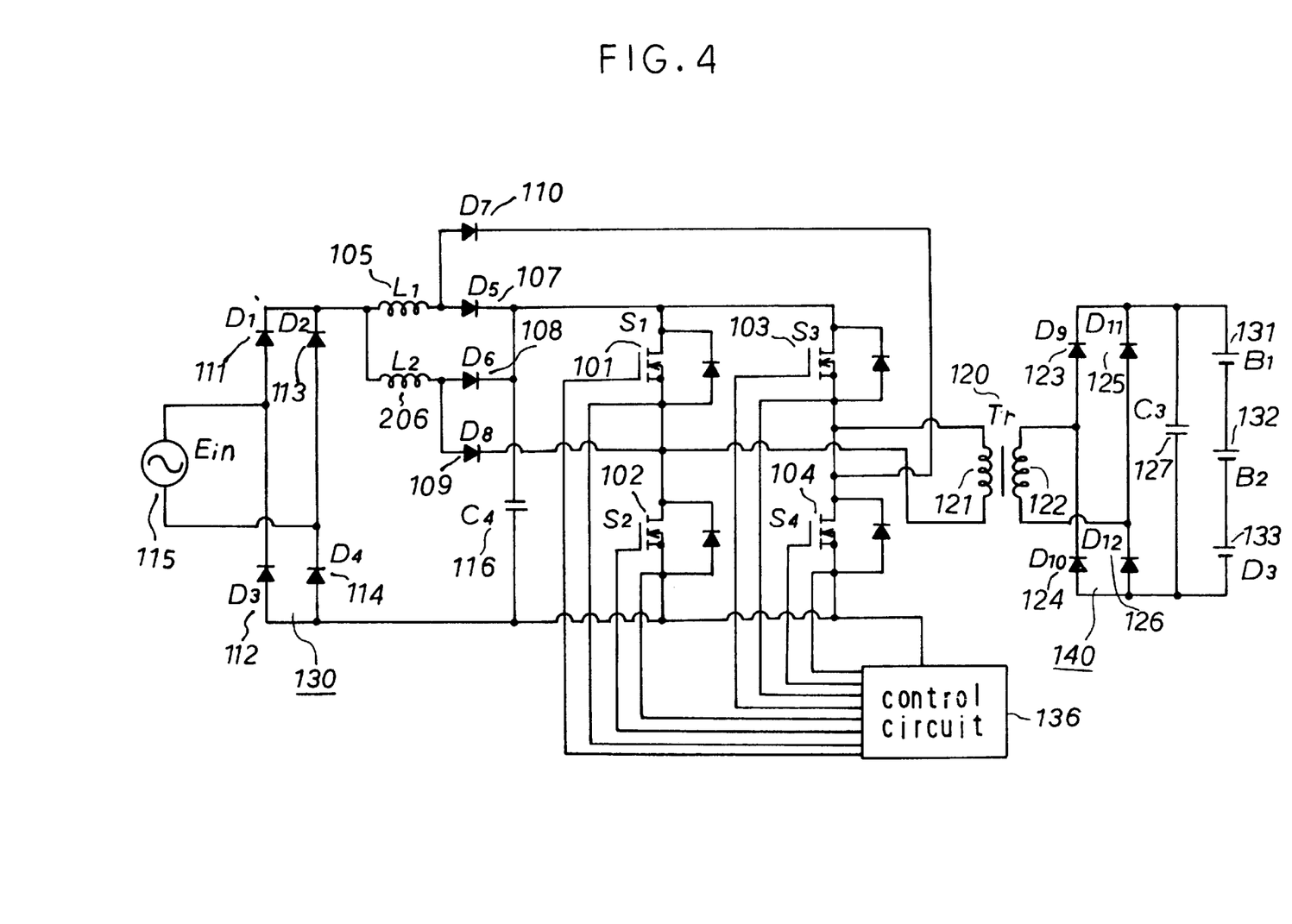
FIG. 4 is a block diagram of a conventional battery charger converter circuit (full-bridged).

Referring now to the block diagram in FIG. 4, a conventional one-converter type battery charger converter circuit having full-bridged switching elements will be explained herebelow.

Although the converter circuit having the full-bridged switching elements is somewhat complicated in circuit configuration, it can effectively generate a double primary voltage.

The full-bridge rectifier circuit 130 and the primary and secondary coils 121 and 122 of the high-frequency transformer 120 are quite the same in circuit configuration as those shown in FIG. 3, and so they will not be described any longer below.

The full-bridge rectifier circuit 130 is connected at the positive terminal thereof to one terminal of each of the two reactors 105 and 206 connected in parallel to each other while the other terminal of these reactors is connected to the positive terminal of the capacitor 116 via the diodes 107 and 108. Also, the negative terminal of the capacitor 116 is connected to the negative terminal of the full-bridge rectifier circuit 130.

A first half-bridge circuit formed from the switching elements 101 and 102, and a second half-bridge circuit formed from the switching elements 103 and 104 are connected at either end thereof in parallel to each other. The common point of connection between these first and second half-bridge circuits is connected to the other terminals of the reactors 105 and 206 through diodes 109 and 110.

The gate and source of each of the four switching elements 101 to 104 forming together the full-bridge circuit are connected through drive circuits to a control circuit 136 formed from a variable-frequency oscillator circuit or VF converter and which provides control signals under which a group of the switching elements 101 and 104 and a group of the switching elements 102 and 103 are controlled to turn on and off alternately.

When the switching element 102 is turned on, the output voltage from the full-bridge circuit 130 is short-circuited through the reactor 206 and diode 109 so that energy is stored into the reactor 206.

When the switching element 102 is turned off, the energy stored in the reactor 206 is charged into the capacitor 116 through the diode 108.

When the switching elements 102 and 103 are turned on simultaneously, the charged potential in the capacitor 116 is applied to the primary coil 121 of the high-frequency transformer 120.

Next, when the switching element 104 is turned on, energy is stored in the reactor 105. When the switching element 104 is turned off, the energy stored in the reactor 105 is charged into the capacitor 116 through the diode 107.

When the switching elements 101 and 104 are turned on simultaneously, the charged potential in the capacitor 116 is applied in a reversed polarity to the primary coil 121 of the high-frequency transformer 120. That is, the switching elements 102 and 104 work as a boosting converter while working as an inverter.

Also, since the booster type converter is made to operate in the discontinuous conduction mode (DCM, the envelope and mean value of an input current are generally proportional to an input voltage, the input power factor is high, and harmonic current is so small as to be dealt with using a small filter for the converter.

However, the one-converter type battery charger is complicated in circuit configuration to improve the properties of the converter. For this reason, many diodes are used and the reactors are provided at the DC side, which leads to a low combined efficiency of the battery charging, increased dimensions of the battery charger structure, and thus an increased manufacturing cost.

SUMMARY OF THE PRESENT INVENTION

Accordingly, the present invention has an object to overcome the above-mentioned drawbacks of the prior art by providing a battery charger converter circuit formed from a reduced number of diodes forming together a rectifier circuit, a boosting reactor (which would be located at the DC side of the rectifier circuit in the prior art) located at an AC input side of the rectifier circuit, and a reduced number of diodes at boosting reactors to simplify the circuit configuration, and overall an improved efficiency of battery charging and a reduced size of a battery charger using the converter circuit.

The above object can be accomplished by providing a converter circuit for an one-converter type battery charger, comprising half-bridge switching elements, in which a half-bridge rectifier circuit is adopted in place of a full-bridge rectifier circuit formed from four diodes to reduce a number of diodes used and boosting reactors are located at the AC side to simplify the circuit configuration by reducing the number of diodes provided parasitically on the boosting reactor.

The above object is also accomplished by providing a converter circuit for an one-converter type battery charger, comprising full-bridged switching elements, in which half-bridge rectifier circuits are adopted in place of a full-bridge rectifier circuit formed from four diodes to reduce a number of diodes used and a single boosting reactor is provided at an AC side, in place of two boosting reactors which would be provided at the DC side to simplify the circuit configuration, for thereby attaining a reduced number of diodes provided parasitically on the boosting reactor.

BRIEF DESCRIPTION OF THE DRAWINGS

These objects and other objects, features, aspects and advantages of the present invention will become more apparent from the following detailed description of the present invention when taken in conjunction with the accompanying drawings, of which.

DETAILED DESCRIPTION OF THE INVENTION

Figure 1:
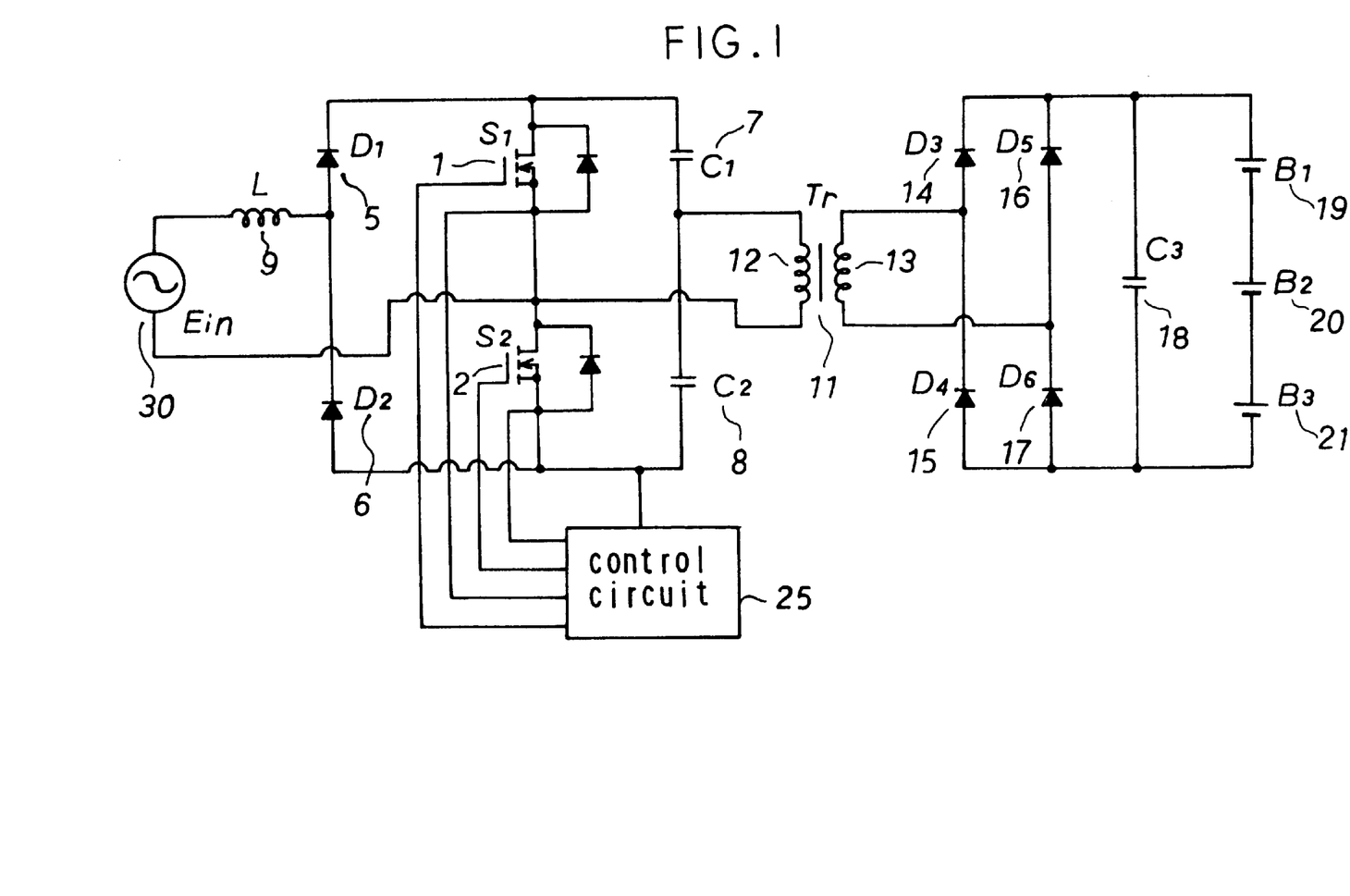
FIG. 1 is a block diagram of a first embodiment of the present invention.

FIG. 1 illustrates in the form of a block diagram a converter for an one-converter type battery charger, comprising half-bridge switching elements, according to a first embodiment of the present invention. As shown, a half-bridge switching circuit is provided comprising two switching elements 1 and 2, and also a half-bridge rectifier circuit is provided comprising two diodes 5 and 6. The half-bridge switching circuit has connected to a common point of connection thereof one end of an AC source 30, while the half-bridge rectifier circuit has connected to a common point of connection thereof another end of the AC source 30 via a reactor 9.

A series circuit formed from capacitors 7 and 8 is connected in parallel to a drain of the switching element 1 and source of the switching element 2. There is provided a high-frequency transformer 11 having a primary coil 12 connected to a common point of connection between the capacitors 7 and 8 and to the common point of connection between the switching elements 1 and 2, thereby forming a primary circuit for the battery charger converter.

The high-frequency transformer 11 has connected to a secondary coil 13 thereof a full-bridge rectifier circuit formed from four diodes 14 to 17, and a capacitor 18 is connected in parallel to either end of the full-bridge rectifier circuit, thereby forming a secondary circuit for the battery charger converter.

A control circuit 25, comprising a variable-frequency oscillator circuit or VR converter provided with two drive circuits, is connected to the gate and source of each of the switching elements 1 and 2. The control circuit 25 provides control signals under which the switching elements 1 and 2 are controlled to turn on and off alternately. If the switching element 1 is turned on when the AC source 30 provides power of a positive-going half wave, the reactor 9 is short-circuited via the diode 5 and switching element 1 so that an energy is stored into the reactor 9. At the same time, a potential in the capacitor 7 is applied to the primary coil 12 of the high-frequency transformer 11. When the switching element 1 is turned off, the stored energy in the reactor 9 is charged into the capacitors 7 and 8 via the diode 5 and a parasitic diode of the switching element 2.

Next, if the switching element 2 is turned on when the AC source provides power of a negative-going half wave, energy is stored into the reactor 9. At a same time, the potential in the capacitor 8 is applied to the primary coil 12 of the high-frequency transformer 11 in an opposite direction to a preceding one. When the switching element 2 is turned off, the stored energy in the reactor 9 is charged into the capacitors 7 and 8 via the diode 6 and a parasitic diode of the switching element 1.

The above-mentioned high-frequency voltage is converted to smoothed DC power through a rectifier circuit provided at the secondary coil of the high-frequency transformer 11 and a parallel capacitor 18, and supplied to cells 19 to 21.

Figure 2:
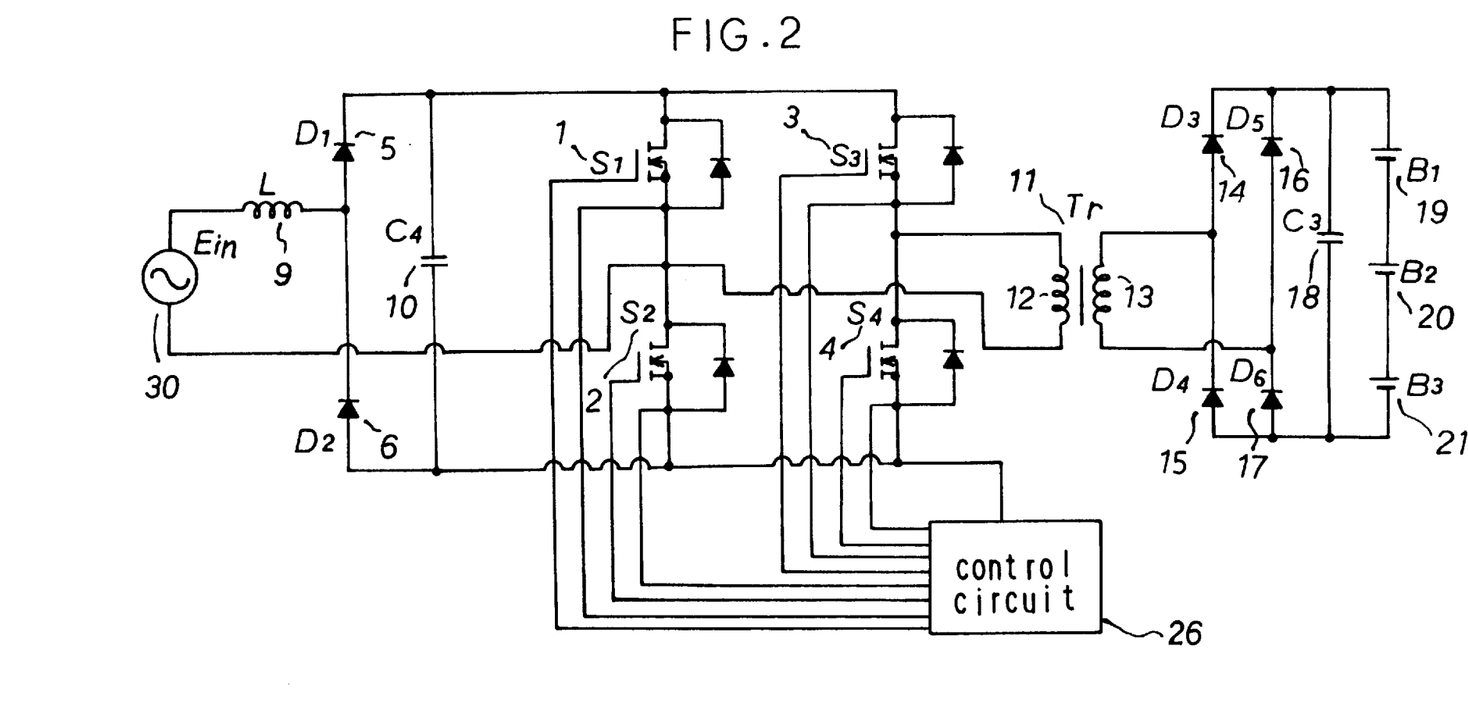
FIG. 2 is a block diagram of a second embodiment of the present invention.

FIG. 2 is a block diagram showing a converter for an one-converter type battery charger, comprising full-bridge switching elements, according to the second embodiment of the present invention. As shown, a half-bridge rectifier circuit is formed from two diodes 5 and 6 and has connected to a common point of connection between them one end of the AC source 30 via the reactor 9. Also it has a capacitor 10 connected in parallel to either end thereof.

A first half-bridge circuit formed from two switching elements 1 and 2 connected in series to each other, and a second half-bridge circuit formed from two switching elements 3 and 4 connected in series to each other are connected at either end, respectively, thereof in parallel to either end of the capacitor 10. The first and second half-bridge circuits have connected to their respective common points of connection the primary coil 12 of the high-frequency transformer 11 to form a primary circuit for the battery charger converter.

It should be noted that the common point of connection of the first half-bridge circuit is connected to the other end of the AC source 30.

The secondary circuit of the high-frequency transformer 11 is quite the same in configuration as that shown in FIG. 1, and so will not be described any longer below.

The four switching elements 1 to 4 have connected to the gates and sources thereof the control circuit 26 formed from a variable-frequency oscillator circuit or VF converter provided with four drive circuits. The control circuit 26 provides control signals under which a group of the switching elements 1 and 4 and a group of the switching elements 2 and 3 are controlled to turn on and off alternately.

If the switching elements 1 and 4 in the first group are turned on simultaneously when the AC source provides a power of a positive-going half wave, energy is stored into the reactor 9 through the switching element 1 and the potential in the capacitor 10 is applied to the primary coil 12 of the high-frequency transformer 11 through the switching elements 1 and 4. Next, when the switching elements 2 and 3 are turned on simultaneously, the potential in the capacitor 10 is applied to the primary coil 12 of the high-frequency transformer 11 in an opposite polarity to a preceding one. Since the switching element 1 is off at this time, the stored energy in the reactor 9 is charged into the capacitor 10 through the diode 5 and the parasitic diode of the switching element 2.

If the switching elements 2 and 3 are turned on simultaneously when the AC source 30 provides a power of a negative-going half wave, energy is stored into the reactor 9 through the switching element 2 and the potential in the capacitor 10 is applied to the primary coil 12 of the high-frequency transformer 11 through the switching elements 2 and 3. Next, when the switching elements 1 and 4 are turned on simultaneously, the potential in the capacitor 10 is applied to the primary coil 12 of the high-frequency transformer 11 in an opposite polarity to a preceding one. Since the switching element 2 is off at this time, the stored energy in the reactor 9 is charged into the capacitor 10 through the diode 6 and the parasitic diode of the switching element 1. That is, when the AC source 30 provides a power of a positive-going half wave, the switching element 1 works as a boosting converter. When the AC source 30 provides a power of a negative-going half wave, the switching element 2 works as a boosting converter. Also the switching elements 1 and 4, and switching elements 2 and 3, work as an inverter.

As having been described in the foregoing, the battery charger converter circuit according to the present invention has a primary circuit comprising a half-bridge rectifier circuit formed from two diodes, a half-bridge circuit formed from two switching elements, a series circuit formed from two capacitors, a reactor provided between a common point of connection of the half-bridge rectifier circuit and an AC source, and a primary coil of a high-frequency transformer connected between a common point of connection of the half-bridge circuit formed from the two switching elements and a common point of connection of the series circuit formed from the two capacitors. Therefore, the circuit configuration can be simplified so that the required number of the diodes is reduced, the efficiency of battery charging is improved, and the battery charger using the converter circuit is compact and manufactured with less costs. Since the current polarity changes at every half period with the boosting reactor located at the AC side, the battery charger incorporating the converter circuit according to the present invention can be designed compact as compared with the conventional battery charger having the boosting reactor provided at the DC side.

Note that according to the present invention, even if the switching elements are full-bridged, the circuit configuration can be simplified to considerably reduce the number of diodes used, which is beneficial for an improved efficiency of charging, compact design and less manufacturing costs.

What is claimed is:

1. A battery charger converter circuit for converting power from an AC source to charge a battery cell, comprising:

a primary circuit including:
 a half-bridge rectifier circuit having first and second diodes connected in series at a rectifier circuit common junction;
 a half-bridge switching circuit having first and second switching elements connected in series at a switching circuit common junction, the half-bridge switching circuit being connected in parallel to the half-bridge rectifier circuit;
 a boost reactor connectable in series with the AC source, and connection means for applying power from the AC source via the boost reactor across the switching circuit common junction and the rectifier circuit common junction; and
 a capacitor series circuit having first and second capacitors connected in series at a capacitor common junction, the capacitor series circuit being connected in parallel to the half-bridge switching circuit;

a high-frequency transformer having a primary coil connected across the capacitor common junction and the switching circuit common junction, and the high frequency transformer having a secondary coil;

a control circuit providing control signals to the first and second switching elements to alternately turn on and off the first and second switching elements whereby said boost reactor alternately conducts current in a first direction via the first diode of the half-bridge rectifier circuit and in a second direction, opposite said first direction, via the second diode of the half-bridge rectifier circuit;

a secondary circuit of the converter, including:
 a full-bridge rectifier circuit having inputs connected across the secondary coil and having outputs; and
 a DC output capacitor connected across the outputs of the full-bridge rectifier circuit; and means for connecting the battery cell across the full-bridge rectifier circuit whereby a high-frequency power generated by the primary circuit is supplied through the high-frequency transformer to the full-bridge rectifier circuit where the high-frequency power is subject to full-wave rectification and the high-frequency power thus rectified is chargeable into the battery cell.

2. A battery charger converter circuit for converting power from an AC source to charge a battery cell, comprising:
   a primary circuit including:
      a half-bridge rectifier circuit having first and second diodes connected in series at a rectifier circuit common junction;
      a first capacitor connected in parallel to the half-bridge rectifier circuit;
      a full-bridge switching circuit having a first half-bridge switching circuit and a second half-bridge switching circuit connected in parallel to each other and the first capacitor, wherein:
         the first half-bridge switching circuit includes first and second switching elements serially connected together at a first common junction;
         the second half-bridge switching circuit includes third and fourth switching elements serially connected together at a second common junction; and
         the first and fourth switching elements are connected together and the second and third switching elements are connected together to effect the parallel connection of the first and second half-bridge switching circuits; and
      a boost reactor connectable in series with the AC source and connection means for applying power from the AC source via the boost reactor across the first common junction of the first half-bridge switching circuit and the rectifier circuit common junction of the half-bridge rectifier circuit;
   a control circuit providing control signals to a first switching element group composed of the first and fourth switching elements and to a second switching element group composed of the second and third switching elements to alternately turn on and off the first and second switching element groups whereby said boost reactor alternately conducts current in a first direction via the first diode of the half-bridge rectifier circuit and in a second direction, opposite said first direction, via the second diode of the half-bridge rectifier circuit;
   a high-frequency transformer having a primary coil connected across the first common junction and the second common junction respectively of the first and second half-bridge switching circuits, and a secondary coil;
   a secondary circuit including:
      a full-bridge rectifier circuit having inputs connected across the secondary coil and having outputs; and
      a DC output capacitor connected across the outputs of the full-bridge rectifier circuit; and
   means for connecting the battery cell across the full-bridge rectifier circuit whereby a high-frequency power generated by the primary circuit is supplied through the high-frequency transformer to the full-bridge rectifier circuit where the high-frequency power is subject to full-wave rectification and the high-frequency power thus rectified is chargeable into the battery cell.

3. The battery charger converter circuit according to claim 1 wherein the first and second switching elements are FET's having gates and sources and the control signals are applied to the gates and the sources.

4. The battery charger converter circuit according to claim 1 wherein:
   the first and second switching elements are respectively first and second FET's each having a drain, a source, a gate and a parasitic diode disposed so as to conduct current from the source to the drain;
   the first FET has the source thereof connected to the drain of the second FET at the switching circuit common junction and the drain thereof connected to the first diode of the half-bridge rectifier circuit at a positive output thereof;
   the second FET has the source thereof connected to the second diode of the half-bridge rectifier circuit at a negative output thereof; and
   whereby the parasitic diode of the second FET serves to conduct current from the boost reactor to the capacitor series circuit via the first diode when the first FET is turned off and the parasitic diode of the first FET serves to conduct current from the boost reactor to the capacitor series circuit via the second diode when the second FET is turned off.

5. The battery charger converter circuit according to claim 4 wherein the control signals are applied to the drains and the sources of the first and second FET's.

6. The battery charger converter circuit according to claim 1 wherein:
   the first and second switching elements each have a first terminal, a second terminal and a diode device disposed so as to conduct current from the second terminal to the first terminal;
   the first switching element has the second terminal thereof connected to the first terminal of the second switching element at the switching circuit common junction and the first terminal thereof connected to the first diode of the half-bridge rectifier circuit at a positive output thereof;
   the second switching element has the second terminal thereof connected to the second diode of the half-bridge rectifier circuit at a negative output thereof; and
   whereby the diode device of the second switching element serves to conduct current from the boost reactor to the capacitor series circuit via the first diode when the first switching is turned off and the diode device of the first switching element serves to conduct current from the boost reactor to the capacitor series circuit via the second diode when the second switching element is turned off.

7. The battery charger converter circuit according to claim 2 wherein the first, second, third and fourth switching elements are FET's having gates and sources and the control signals are applied to the gates and the sources.

8. The battery charger converter circuit according to claim 2 wherein:
   the first, second, third and fourth switching elements are respectively first, second, third and fourth FET's each having a drain, a source, a gate and a parasitic diode disposed so as to conduct current from the source to the drain;
   the first FET has the source thereof connected to the drain of the second FET at the first common junction and the drain thereof connected to the first diode of the half-bridge rectifier circuit at a positive output thereof;
   the second FET has the source thereof connected to the second diode of the half-bridge rectifier circuit at a negative output thereof;
   the third FET has the source thereof connected to the drain of the fourth FET at the second common junction and the drain thereof connected to the first diode of the half-bridge rectifier circuit at the positive output thereof;
   the fourth FET has the source thereof connected to the second diode of the half-bridge rectifier circuit at the negative output thereof; and whereby the parasitic diode of the second FET serves to conduct current from the boost reactor to the first capacitor via the first diode when the first FET is turned off and the parasitic diode of the first FET serves to conduct current from the boost reactor to the first capacitor via the second diode when the second FET is turned off.

9. The battery charger converter circuit according to claim 8 wherein the control signals are applied to the drains and the sources of the first, second, third and fourth FET's.

10. The battery charger converter circuit according to claim 2 wherein:

the first, second, third and fourth switching elements each have a first terminal, a second terminal and a diode device disposed so as to conduct current from the second terminal to the first terminal;

the first switching element has the second terminal thereof connected to the first terminal of the second switching element at the first common junction and the first terminal thereof connected to the first diode of the half-bridge rectifier circuit at a positive output thereof;

the second switching element has the second terminal thereof connected to the second diode of the half-bridge rectifier circuit at a negative output thereof;

the third switching element has the second terminal thereof connected to the first terminal of the fourth switching element at the second common junction and the first terminal thereof connected to the first diode of the half-bridge rectifier circuit at the positive output thereof;

the fourth switching element has the second terminal thereof connected to the second diode of the half-bridge rectifier circuit at the negative output thereof; and whereby the diode device of the second switching element serves to conduct current from the boost reactor to the first capacitor via the first diode when the first switching is turned off and the diode device of the first switching element serves to conduct current from the boost reactor to the first capacitor via the second diode when the second switching element is turned off.

11. A battery charger converter circuit for converting power from an AC source to charge a battery cell, comprising:

a half-bridge rectifier circuit having first and second diodes connected in series at a rectifier circuit common junction;

a half-bridge switching circuit having first and second switching elements connected in series at a switching circuit common junction, the half-bridge switching circuit being connected in parallel to the half-bridge rectifier circuit;

a boost reactor connectable in series with the AC source, and connection means for applying power from the AC source via the boost reactor across the switching circuit common junction and the rectifier circuit common junction;

a capacitor series circuit having first and second capacitors connected in series at a capacitor common junction, the capacitor series circuit being connected in parallel to the half-bridge switching circuit;

a high-frequency transformer having a primary coil connected across the capacitor common junction and the switching circuit common junction, and the high frequency transformer having a secondary coil;

a control circuit providing control signals to the first and second switching elements to alternately turn on and off the first and second switching elements whereby said boost reactor alternately conducts current in a first direction via the first diode of the half-bridge rectifier circuit and in a second direction, opposite said first direction, via the second diode of the half-bridge rectifier circuit; and a rectifying circuit connect across the secondary coil and having output for applying a DC voltage to the battery cell to effect charging thereof.

12. The battery charger converter circuit according to claim 11 wherein the first and second switching elements are FET's having gates and sources and the control signals are applied to the gates and the sources.

13. The battery charger converter circuit according to claim 11 wherein:

the first and second switching elements are respectively first and second FET's each having a drain, a source, a gate and a parasitic diode disposed so as to conduct current from the source to the drain;

the first FET has the source thereof connected to the drain of the second FET at the switching circuit common junction and the drain thereof connected to the first diode of the half-bridge rectifier circuit at a positive output thereof;

the second FET has the source thereof connected to the second diode of the half-bridge rectifier circuit at a negative output thereof; and whereby the parasitic diode of the second FET serves to conduct current from the boost reactor to the capacitor series circuit via the first diode when the first FET is turned off and the parasitic diode of the first FET serves to conduct current from the boost reactor to the capacitor series circuit via the second diode when the second FET is turned off.

14. The battery charger converter circuit according to claim 13 wherein the control signals are applied to the drains and the sources of the first and second FET's.

15. The battery charger converter circuit according to claim 11 wherein:

the first and second switching elements each have a first terminal, a second terminal and a diode device disposed so as to conduct current from the second terminal to the first terminal;

the first switching element has the second terminal thereof connected to the first terminal of the second switching element at the switching circuit common junction and the first terminal thereof connected to the first diode of the half-bridge rectifier circuit at a positive output thereof;

the second switching element has the second terminal thereof connected to the second diode of the half-bridge rectifier circuit at a negative output thereof; and whereby the diode device of the second switching element serves to conduct current from the boost reactor to the capacitor series circuit via the first diode when the first switching is turned off and the diode device of the first switching element serves to conduct current from the boost reactor to the capacitor series circuit via the second diode when the second switching element is turned off.

16. A battery charger converter circuit for converting power from an AC source to charge a battery cell, comprising:

a primary circuit including:
    a half-bridge rectifier circuit having first and second diodes connected in series at a rectifier circuit common junction;

a first capacitor connected in parallel to the half-bridge rectifier circuit;

a full-bridge switching circuit having a first half-bridge switching circuit and a second half bridge switching circuit connected in parallel to each other and the first capacitor, wherein:

the first half-bridge switching circuit includes first and second switching elements serially connected together at a first common junction;

the second half-bridge switching circuit includes third and fourth switching elements serially connected together at a second common junction; and the first and fourth switching elements are connected together and the second and third switching elements are connected together to effect the parallel connection of the first and second half-bridge switching circuits; and a boost reactor connectable in series with the AC source and connection means for applying power from the AC source via the boost reactor across the first common junction of the first half-bridge switching circuit and the rectifier circuit common junction of the half-bridge rectifier circuit;

a control circuit providing control signals to a first switching element group composed of the first and fourth switching elements and to a second switching element group composed of the second and third switching elements to alternately turn on and off the first and second switching element groups whereby said boost reactor alternately conducts current in a first direction via the first diode of the half-bridge rectifier circuit and in a second direction, opposite said first direction via the second diode of the half-bridge rectifier circuit;

a high-frequency transformer having a primary coil connected across the first common junction and the second common junction respectively of the first and second half-bridge switching circuits and a secondary coil; and a rectifying circuit connect across the secondary coil and having output for applying a DC voltage to the battery cell to effect charging thereof.

17. The battery charger converter circuit according to claim 16 wherein the first, second, third and fourth switching elements are FET's having gates and sources and the control signals are applied to the gates and the sources.

18. The battery charger converter circuit according to claim 16 wherein:

the first, second, third and fourth switching elements are respectively first, second, third and fourth FET's each having a drain, a source, a gate and a parasitic diode disposed so as to conduct current from the source to the drain;

the first FET has the source thereof connected to the drain of the second FET at the first common junction and the drain thereof connected to the first diode of the half-bridge rectifier circuit at a positive output thereof;

the second FET has the source thereof connected to the second diode of the half-bridge rectifier circuit at a negative output thereof;

the third FET has the source thereof connected to the drain of the fourth FET at the second common junction and the drain thereof connected to the first diode of the half-bridge rectifier circuit at the positive output thereof;

the fourth FET has the source thereof connected to the second diode of the half-bridge rectifier circuit at the negative output thereof; and whereby the parasitic diode of the second FET serves to conduct current from the boost reactor to the first capacitor via the first diode when the first FET is turned off and the parasitic diode of the first FET serves to conduct current from the boost reactor to the first capacitor via the second diode when the second FET is turned off.

19. The battery charger converter circuit according to claim 18 wherein the control signals are applied to the drains and the sources of the first, second, third and fourth FET's.

20. The battery charger converter circuit according to claim 16 wherein:

the first, second, third and fourth switching elements each have a first terminal, a second terminal and a diode device disposed so as to conduct current from the second terminal to the first terminal;

the first switching element has the second terminal thereof connected to the first terminal of the second switching element at the first common junction and the first terminal thereof connected to the first diode of the half-bridge rectifier circuit at a positive output thereof;

the second switching element has the second terminal thereof connected to the second diode of the half-bridge rectifier circuit at a negative output thereof;

the third switching element has the second terminal thereof connected to the first terminal of the fourth switching element at the second common junction and the first terminal thereof connected to the first diode of the half-bridge rectifier circuit at the positive output thereof;

the fourth switching element has the second terminal thereof connected to the second diode of the half-bridge rectifier circuit at the negative output thereof; and whereby the diode device of the second switching element serves to conduct current from the boost reactor to the first capacitor via the first diode when the first switching is turned off and the diode device of the first switching element serves to conduct current from the boost reactor to the first capacitor via the second diode when the second switching element is turned off.

* * * * *